United States Patent [19]
Woodward

[11] Patent Number: 5,079,751
[45] Date of Patent: Jan. 7, 1992

[54] ACOUSTIC RANGING SYSTEMS

[75] Inventor: Steven J. Woodward, Port Hope, Canada

[73] Assignee: Federal Industries Industrial Group Inc., Winnipeg, Canada

[21] Appl. No.: 658,702

[22] Filed: Feb. 20, 1991

[30] Foreign Application Priority Data

Mar. 14, 1990 [GB] United Kingdom ............... 9005722

[51] Int. Cl.⁵ .............................................. G01S 15/00
[52] U.S. Cl. ......................................... 367/96; 367/99
[58] Field of Search ................... 367/99, 96; 364/561, 364/579

[56] References Cited

U.S. PATENT DOCUMENTS

| | | | |
|---|---|---|---|
| 2,960,678 | 11/1960 | Beard | 367/908 |
| 3,116,472 | 12/1963 | Rich | 367/128 |
| 4,199,246 | 4/1980 | Muggli | 367/96 |
| 4,439,846 | 3/1984 | Rodriguez | 367/99 |
| 4,596,144 | 6/1986 | Panton et al. | 73/290 V |
| 4,700,569 | 10/1987 | Michalski et al. | 367/908 |
| 4,831,565 | 5/1989 | Woodward | 367/99 |
| 4,890,266 | 12/1989 | Woodward | 367/99 |
| 4,992,998 | 2/1991 | Woodward | 367/99 |

FOREIGN PATENT DOCUMENTS

WO90/08966 8/1990 PCT Int'l Appl. .
2151357A 7/1985 United Kingdom .

Primary Examiner—Daniel T. Pihulic
Attorney, Agent, or Firm—Ridout & Maybee

[57] ABSTRACT

In an acoustic pulse-echo ranging system, the transmitter and receiver, which respectively generate pulses of acoustic energy and receive reflections of the same, are electronically tuned to determine their operating frequency, the electronic tuning being controlled responsive to stored data relating to a particular transducer being utilized to transmit and receive a pulse. A single transmitter and receiver can be utilized to service a number of different transducers, being automatically tuned to an appropriate frequency for each transducer as it is used to transmit and receive a pulse. The system can verify the nominal operating frequency of each transducer, and can also adjust the operating frequency used with any particular transducer to optimize its performance.

10 Claims, 9 Drawing Sheets

ACOUSTIC RANGING SYSTEMS

BACKGROUND OF THE INVENTION

1. Field of the Invention

This invention relates to acoustic range finding systems of the type in which an electro-acoustic transducer transmits a pulse or shot of acoustic energy towards a surface whose distance is to be measured, and subsequent signals received from the transducer are monitored to determine the temporal location of an echo from that surface.

2. Review of the Art

Different transducer characteristics and operating parameters are required for use in different circumstances. In general, the best performance at short ranges is obtained using transducers operating at relatively high frequency, typically of the order of 50 kHz for ranges up to 20 meters or so, whilst at longer ranges, transducers operating at lower frequencies provide better performance, with frequencies of the order of 12 kHz being suitable for very long ranges of 50 meters or more, and intermediate frequencies for intermediate distances. Broadly speaking, the higher frequencies provide more sharply defined echoes and better resolution, but are subject to more rapid attenuation with distance particularly under adverse conditions such as dusty environments, whilst low frequencies are less subject to attenuation but provide more diffuse echoes and lower resolution. The reflectivity and shape of surfaces whose position is to be determined also varies with frequency, and thus the identity of the substance whose surface is to be measured, and its angle of repose, may influence the choice of transducer frequency. For example, granular material with a sloping surface tends to reflect low frequencies against a wall of the vessel thus producing a weak direct echo, and strong indirect echoes reflect one or more times from the wall of the vessel. This characteristic is less marked with higher frequencies, but in deep vessels it is not practicable to use as high a frequency as would be desirable to mitigate this problem. It is common practice to utilize longer pulse widths with lower frequencies, both to allow the transmission of more sonic energy, and to allow for the slower response time of low frequency transducers. Since the received signal is usually very small compared with the transmitted signal, and is subject to high levels of noise, both the transmitter and receiver are turned close to the resonant frequency of the transducer so as to optimize the signal-to-noise ratio of the system. The transmission frequency is sometimes slightly offset from the actual resonant frequency of the transducer for various reasons; thus it is known to tune the transmitter for optimum echo amplitude, which may occur at a slight offset from the nominal resonant frequency, and also to shift or sweep the transmitter frequency over a small range so as to avoid nulls in the echo response due to interference effects within the environment being monitored. Such transmitter frequency changes are fairly small, and can be accommodated within the bandwidth of the receiver.

U.S. Pat. No. 4,199,246 (Muggli), issued Apr. 22, 1980, describes an ultrasonic ranging system in which the transmitter is driven by a voltage controlled oscillator, such that the frequency transmitted by the transducer is changed in a predetermined manner over a substantial range during the course of the transmitted pulse. The bandwidth of the receiver is varied again according to a preset pattern, during a subsequent period so that the receiver bandwidth is narrowed with the passage of time following the pulse, the passband of the receiver being centered upon the lowest frequency transmitted. By configuring the transmitted pulse so that a short initial portion is transmitted at a relatively high frequency, which is then reduced in one or more steps to a relatively low frequency, and configuring the receiver so that its initial bandwidth is wide enough to pass the highest as well as the lowest frequency, short range echoes of the high frequency pulse components may be detected, but at longer ranges, reception of the low frequency component and exclusion of noise is optimized, by decreasing the bandwidth and thus improving the quality factor (Q) of the receiver.

The Muggli system is subject to two constraints which limit its applicability. The transducer itself must be capable of operation over a wide range of frequencies, and the noise immunity of the system at short ranges is very poor because of the wide bandwidth of the receiver at those frequencies. Neither of these limitations need be serious in the camera control applications for which the Muggli system is clearly primarily designed, involving as they do low power transducers, comparatively short ranges, and environments which are comparatively quiet at the frequencies of interest; they are however highly significant in typical industrial applications for which suitable transducers operating over a wide frequency range are not generally available. Instead it has been necessary to select a suitable transducer, and to provide a transmitter/receiver system whose frequency characteristics and output voltage are matched to the transducer.

In order to overcome this problem, it is known to provide transducers with an integral matched transceiver unit and a preprocessor for received signals which converts received echo information into data of standardized format which is essentially independent of the transducer type. This standardized data can then be transmitted for further processing at a remote point, in a manner independent of the transducer characteristics. Such an arrangement is disclosed in U.S. Pat. No. 4,700,569 (Michalski). Whilst such an arrangement simplifies the remote processing unit for a transducer, and enables it to handle data from different types of transducers, this is at the expense of the addition of complex circuitry to each transducer.

SUMMARY OF THE INVENTION

The present invention seeks to provide a control unit for an acoustic ranging system which can be utilized in conjunction with any of a wide range of different electro-acoustic transducers, including combinations of transducers of different types in arrangements in which a number of transducers are controlled by a single control unit. To the best of applicant's knowledge, it has only hitherto been possible to use a single unit to control multiple transducers in a scanning arrangement where the transducers have had substantially similar nominal requirements in terms of drive frequency and potential.

According to the invention there is provided a control unit for connection to an electro-acoustic transducer to form an acoustic ranging system, comprising a transmitter for generating shots of high frequency electric energy for application to said transducer, a tuned receiver for receiving and amplifying high frequency energy from said transducer; means for digitizing output from said receiver, and a control computer controlling said transmitter to time said shots and for processing said digitized receiver output to recognize therein features indicative of a primary echo from a target being ranged, said unit further including electronically controlled means for determining the operating frequency of said transmitter, and electronically controlled means for causing the tuning of said receiver to track the operation frequency of said transmitter, and said control computer further controlling the electronic tuning means for the transmitter during each shot responsive to data relative to characteristics of said transducer.

Provision is preferably made in the unit for selective connection to each of a plurality of transducers under control of the computer, which stores separate data in respect of each transducer which is utilized to control the electronic timing means for the transmitter when connection is established to that transducer.

Further features of the invention will become apparent from the following description of a presently preferred embodiment thereof.

DESCRIPTION OF THE PREFERRED EMBODIMENT

Figure 1:
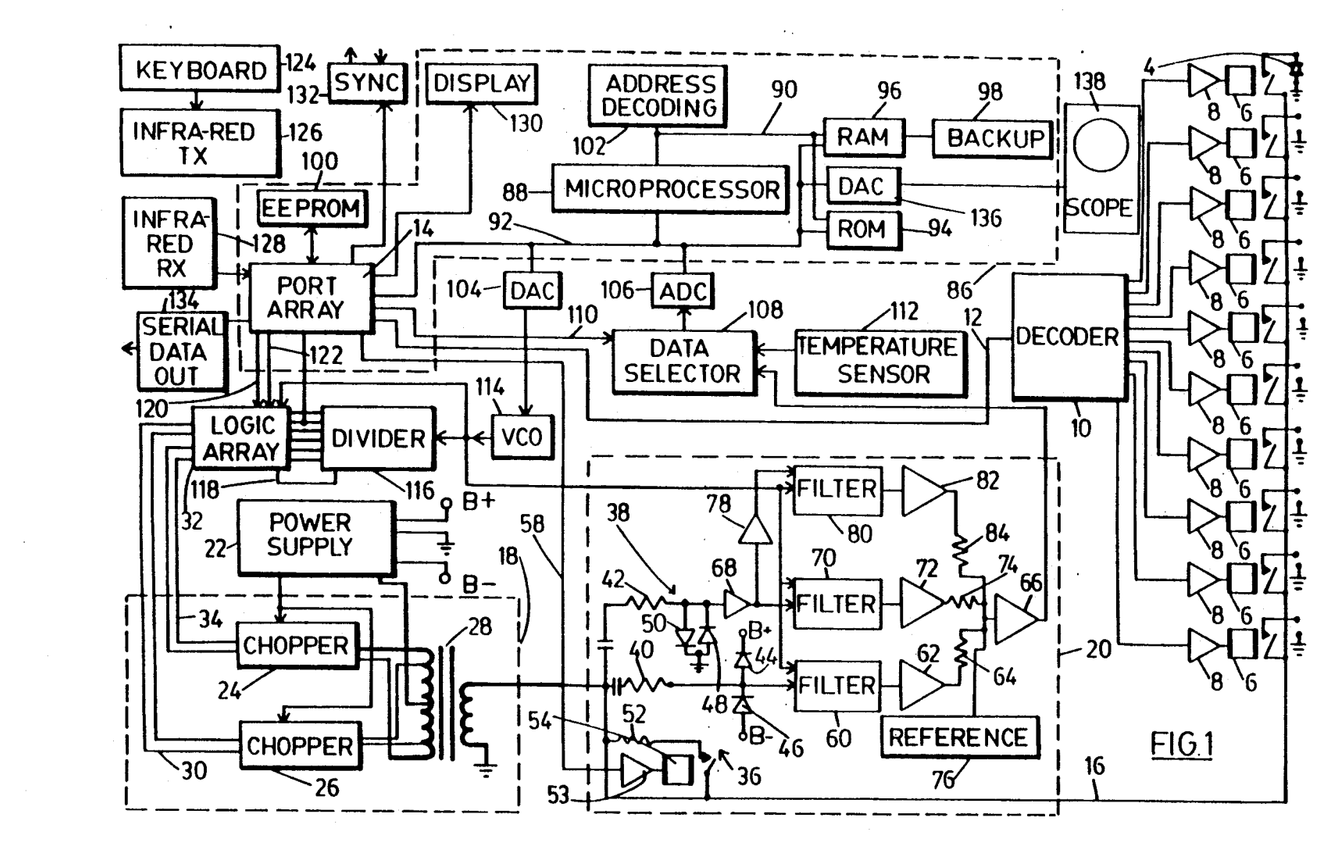
FIG. 1 is a block diagram of an ultrasonic range finding system incorporating the invention.

Referring to FIG. 1, a control unit is shown intended for connection to a number of ultrasonic transducers 4 of which only one is shown. The transducers are located in a number of bins, silos, channels or other vessels being monitored, each of which may be referred to as a point. In general a single transducer will be located at each point, but in some cases, as discussed in connection with FIG. 7, more than one transducer may be located at a single point.

Terminals of each transducer 4 are connected respectively to ground and to a line 16 though normally open contacts of a relay 6, itself controlled through a driver 8, typically a transistor of suitable rating, by one output of a decoder 10, any one output of the decoder can be selected by applying a suitable combination of logic levels on lines 12 controlled by a multiple port array 14. The line 16 is connected both to the output of a transmitter 18 and the input of a receiver 20.

The transmitter 18 is formed by a converter unit which receives direct current at low voltage from a power supply 22 (which also provides suitable supply potentials to the components making up the remainder of the unit) and applies it through a chopper unit 24 or 26 to a transformer 28 whose secondary is connected between ground and the line 16. The chopper unit 24 comprises switching transistors connected between one pole of the power supply 22 and the ends of a primary winding of the transformer, the other pole of the power supply being connected to a centre tap of the transformer primary. The transistors are driven through suitable driver amplifiers by signals on lines 34 from a programmable logic array 32. The chopper unit 26 is similar, except that its transistors are connected to intermediate taps on the primary winding, and it receives its driver signals on lines 30. Only one chopper unit is driven at a time: the step-up ratio of the transformer 28 is higher when the chopper unit 26 is used, and thus the output potential is higher, for example 700 volts peak to peak compared to 350 volts peak to peak when chopper unit 24 is used. The transmitter operates at a frequency determined by the signals supplied to it by the logic array 32, which frequency is in turn controlled by a voltage controlled oscillator 114 and a divider 116 in a manner described further below.

The transducer signals from line 16 enter the receiver 20 through clipping circuits 36 and 38 which protect its input from the high output potentials generated by the transmitter. The clipping circuits comprise, firstly, current limiting resistors 40 and 42 and, secondly, oppositely connected limiting diodes 44, 46, 48 and 50 to limit excursions of the signals beyond the input capability of the receiver components. The current limiting resistor 42 also acts as a load resistor as to apply a desired amount of damping to the transducer thus enabling its Q to be adjusted to a desired level. This loading can be altered by switching in a parallel resistor 52 by means of a relay 54 controlled through a relay driver 53 by a control line 58 from the port array 14.

The output of clipping circuit 36 is applied to an electronically controlled bandpass filter 60, the centre frequency of which is set by applying a clock signal which is a multiple (in this example 50 times) of the desired centre frequency. Such a filter is available under part no. ML2111 from Micro Linear, a similar component LMF100 also being available from National Semiconductor. The output of the filter is applied to a logarithmic amplifier 62 and thence through resistor 64 to an input of a summing amplifier 66.

The output of the clipping circuit 38 is applied to a 50 db low noise amplifier 68, and thence to a filter 70, logarithmic amplifier 72, and a resistor 74 respectively identical to filter 60, amplifier 62, and resistor 64, to the input of summing amplifier 66. The output of the amplifier 68 is also applied to a further 50 db amplifier 78, and thence via a further identical filter 80, amplifier 82 and resistor 84 to the summing amplifier 66 together with a reference input from reference generator 76. The receiver output, proportional to the logarithm of that component of the receiver input which is at the frequency set by the filters, appears at the output of amplifier 66.

The arrangements described so far are generally similar to those described in our U.S. Pat. No. 4,596,144, the essential differences being the provision for electronic tuning of the filters 60, 70 and 80, the control of transmitter frequency, the selectable output voltage of the transmitter, and the selectable loading imposed by the input circuits of the receiver. Whilst in each of the latter two cases, only two selections are shown in the example described, a wider selection could be provided; thus the output voltage of the transmitter could be varied over a wide range utilizing a regulator circuit digitally controlled by a digital-to-analog converter, or additional resistors 52 could be switched in or out of circuit. The disclosed transmitter arrangement using additional taps on the transformer 28 is advantageous since the impedance of the transmitter output is reduced with voltage, which suits the characteristics of typical families of transducers.

The transmitter 18 and receiver 20, together with the decoder 10, are controlled by a computer 86, which incorporates the port array 14 already mentioned. The computer is based upon a microprocessor 88 having address and data busses 90 and 92, and operating under control of a program stored in read only memory 94. The computer is provided with random access memory 96 for operating purposes and storage of variables, the memory 96 being provided with a short term back-up power supply 98 to preserve its contents in the event of a short term interruption in the supply of electrical power to the power supply unit 22. Variables requiring longer term storage are stored in an EEPROM 100 or alternative non-volatile electrically alterable memory accessed through port array 14. Address decoding for various peripherals is provided by a programmable logic array 102, the peripherals including the port array 14 already mentioned, a digital-to-analog converter 104 and an analog-to-digital converter 106.

A data selector circuit 108 using transmission gates controlled by a line 110 from the port array 14 allows the analog-to-digital converter 106 to receive its input from either the receiver 20 or a temperature sensor 112. The output of the digital-to-analog converter 104 is applied to the control input of the voltage controlled oscillator 114, the output of which is applied both to the filters 60, 70 and 80 to control their centre frequency, and to a multi-stage divider 116 through which the transmitter frequency is controlled. The receiver tuning thus tracks the transmitter frequency. The outputs of the divider are applied to the logic array 32 so that the latter can detect when fifty input cycles have been received by the counter from the oscillator 114 and apply a reset pulse on line 118 to the divider 116, thus implementing a divide-by-fifty function to produce a desired transmitter frequency. The array 32 also generates appropriately phased outputs to drive the chopper 24 or 26, under control of lines 120 and 122 from port array 14, which determine respectively whether an output is provided to the transmitter, and, if so, whether the output is on lines 30 or 34 so as to provide a high or low transmitter output voltage. An input is taken from the output of the divider to the port array so as to provide feedback data to the computer 86 concerning the frequency available to drive the transmitter; the frequency is held to a desired value by controlling the voltage applied to the VCO 114 by means of data applied to the digital-to-analog converter 104. The small degree of 'hunting' in the VCO frequency which inevitably occurs is desirable. It avoids problems, which can occur when the transmitter frequency is rigidly maintained, due to valid echoes being cancelled by interference effects within an environment being monitored. Such effects are very frequency specific and it is known to avoid them by deliberately sweeping the transmitter frequency over a small range. The present apparatus automatically avoids the problem without separate provision being made to sweep the transmitter frequency.

Provision is made for data input to and output from the computer. A keyboard 124 is linked to the port array 14 by an infra-red transmitter 126 and an infra-red receiver 128, the arrangement being configured and programmed as described in more detail in U.S. Pat. No. 4,821,215, issued Apr. 11, 1989, and further lines from the array 14 control a display 130 and a serial data transmitter 134. A further digital to analog converter 136 provides an analog output to an optional oscilloscope 138. Rather than providing a separate converter, the converter 104 may be used on a switched basis during reception of the return signal after the transmitter and filter frequencies have been set. Further lines from the array 14 provide input and output from a synchronization circuit 132, enabling multiple units in accordance with the invention to synchronize their transmission of ultrasonic pulses so as to avoid mutual interference.

The computer 86 is also generally similar to that of prior U.S. Pat. Nos. 4,596,144; 4,831,565 and 4,890,266, apart from the provisions made and described above for controlling the operating frequency and other characteristics of the transmitter and the receiver; the control program for operating the device, and its function and operation, is also generally similar to what is described in my prior patents, apart from those aspects of the program which control and exploit the additional features of the apparatus discussed above. These aspects are discussed further below with reference to the flow diagrams of FIGS. 2-7.

Figure 2:
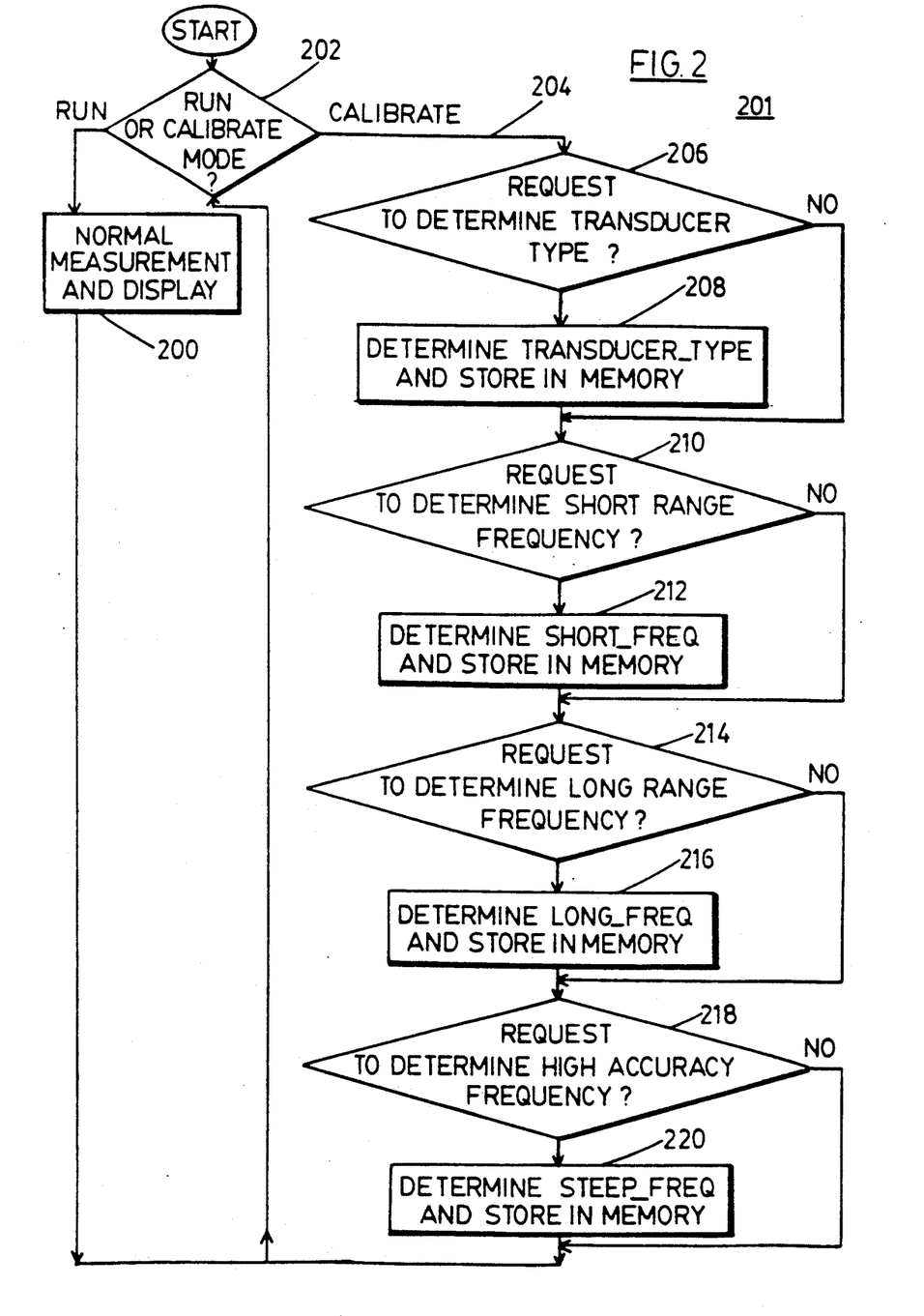
FIGS. 2, 3, 4, 5, 6, 6A, 7 and 7A are flow diagrams illustrating various features of a control program for the system of FIG. 1.

Referring to FIG. 2, the control program for the apparatus has a normal measurement and display routine 200 operating in a program loop which includes a routine 202 to test a flag, set from the keyboard 124, which indicates whether the apparatus is to be operated in a "run" mode looping through the routine 200, or a calibrate mode in which it branches at 204 to a loop through an alternative routine 201 which contains procedures necessary to calibrate the apparatus in various respects. It should be understood that the procedures shown do not necessarily constitute all of the calibration procedures that may be included in the loop but only certain procedures relevant to the features of the apparatus discussed above, which enable it to be matched to and exploit the characteristics of different transducers. The calibration loop tests for the entry, typically by an operator from the keyboard, of various calibration requests, and carries out such requests when they are detected. The requests may also be entered automatically, for example as part of a start-up sequence, or during intervals when operating conditions in bins being monitored are found to be suitable. For each request it will normally be necessary to determine which transducer is to be calibrated. This selection may be made manually from the keyboard, or automatically in sequence, or according to availability as part of an automatic calibration sequence. If only one transducer is being controlled, this function could of course be eliminated, but conveniently the identity of a transducer to be calibrated is included in the request.

A first type of request which may occur is a request 206 to determine a variable TRANSDUCER_TYPE indicating the type of a transducer 4 connected to the apparatus. If such a request is detected, the subroutine 208 shown in more detail in FIG. 3 may be followed. Further requests 210, 214 and 218 are to determine and store in memory variables SHORT_FREQ, LONG_FREQ and STEEP_FREQ. These represent respectively the optimum frequency at which to operate the transducer for short range measurements, the optimum frequency at which to operate the transducer for long range measurements, and the optimum frequency at which to operate the transducer in order to obtain maximum accuracy, these requests if detected being carried out by procedures DETERMINE SHORT_FREQ, DETERMINE LONG_FREQ and DETERMINE STEEP_FREQ. The first of these is shown in more detail in FIG. 4, the remaining two being generally similar.

Figure 3:
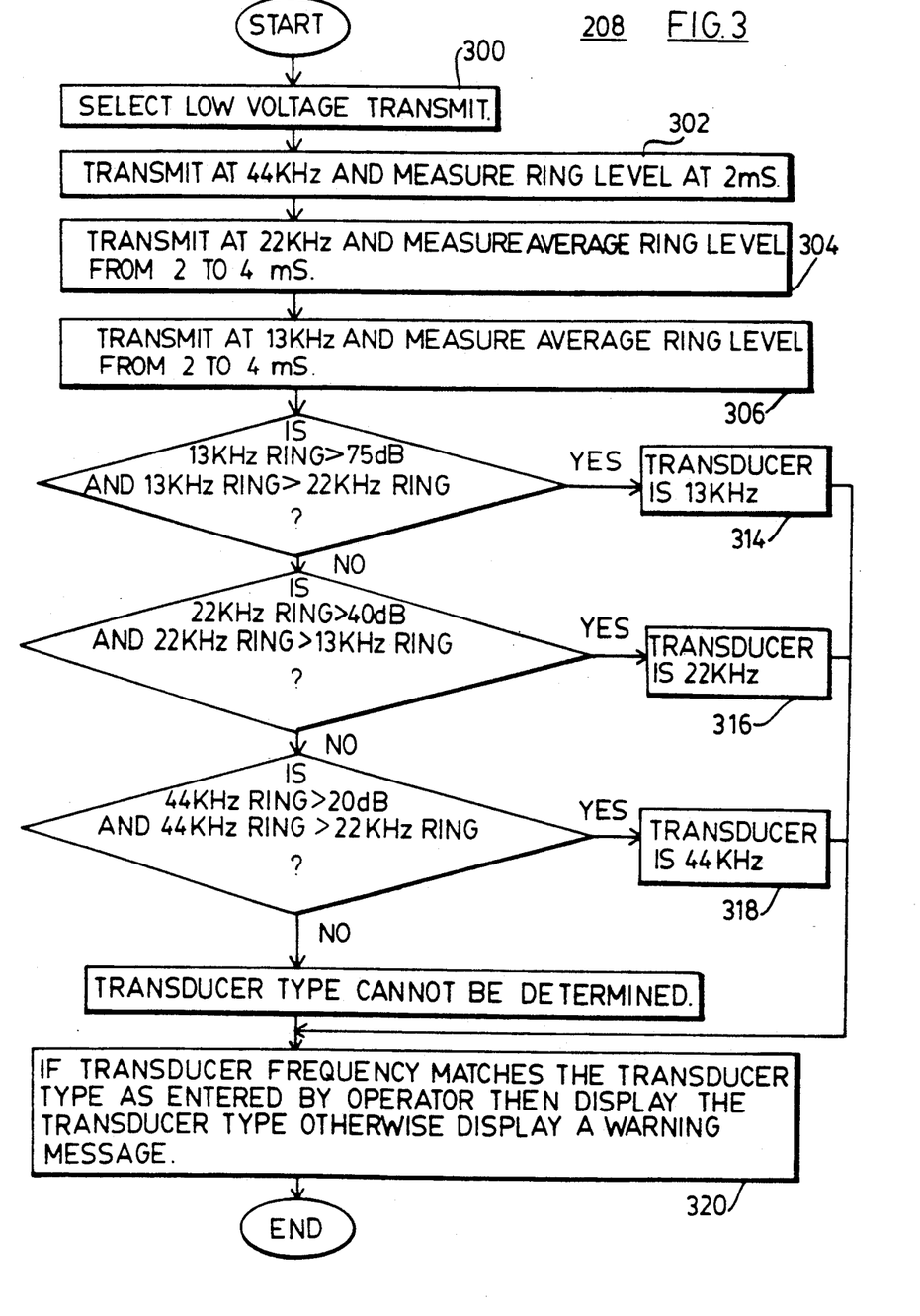

Referring to FIG. 3, the procedure DETERMINE TRANSDUCER_TYPE causes the port array 14 to be programmed so that the decoder 10 selects (step 300) the correct transducer, and so that the logic array 32 selects lines 34 for the application of signals to the transmitter 18, corresponding to a choice of the lower of the two transmitter output potentials; this is selected so as to be within the voltage ratings of all of the different transducers likely to be utilized. For the purposes of the following description, it is assumed that three types of transducer may be utilized, having nominal operating frequencies of 13 kHz, 22 kHz and 44 kHz respectively.

In step 302, digital data is applied to the digital-to-analog converter (DAC) 104 such as to provide an output potential which, when applied to the VCO 114, causes the latter to oscillate at 2.2 MHz, i.e. fifty times 44 kHz. The VCO output is divided down to the latter frequency by the combination of the divider 116 and the logic array 32. The frequency is monitored by a line from the output of the divider to the port array 14, and the data applied to DAC 104 is adjusted so as to obtain the desired frequency. The output of VCO 114 is also applied to the filters 60, 70 and 80 so as to tune them to 44 kHz. When the desired transmitter frequency has been attained, the lines 34 are enabled briefly to permit a burst of 44 kHz energy to be applied to that transducer 4 which has been selected by decoder 10. The resulting output signal from the receiver 20 is digitized by analog-to-digital converter (ADC) 106, and the samples stored in RAM 96 to form an echo profile of at least an initial portion of the receiver response during a ringdown period.

Initially, the receiver will saturate during the transmitted pulse whilst the clipping circuits 36 and 38 are operative, with this being followed by a ringdown period during which the transducer will still be ringing following application of the transmit pulse. If the transducer is a 44 kHz transducer, the energization will be at a frequency close to the resonant frequency of the transducer, and a strong pulse will be followed by substantial but diminishing ringing which will occur during the ringdown period. If the transducer is a 22 kHz or 13 kHz transducer, the energization will be at a frequency remote from its resonant frequency, and a weak pulse will be produced with little or no ringing.

The amplitude of samples of the echo profile obtained during the ringdown period at a defined interval after commencement of the pulse, for example 2 ms, is measured to provide an indication of the amplitude of the ringing produced by the transducer.

The DAC 104 is then reprogrammed to adjust the transmitter frequency to 22 kHz, and the above procedure is repeated in step 304, and after further adjustment of the frequency to 13 Hz, again in step 306. Because of the longer ringdown expected from the lower frequency transducers, the average level of the samples over a period of typically 2 to 4 ms after commencement of the pulse may be determined.

The average levels determined in steps 302, 304 and 306 are then each compared with upper and lower thresholds in steps 308, 310 and 312, for 13 KHz, 22 KHz and 44 KHz transducers respectively, the thresholds being selected according to the characteristics of the transducers utilized. The thresholds shown in FIG. 3 are exemplary only. If the level tested in any of these three steps falls between the thresholds, the transducer type is set in step 314, 316 or 318, whilst if none of the levels falls within the specified threshold, the transducer is considered defective or absent. The transducer type setting so obtained can be utilized directly, but if any ambiguity is possible as to transducer type, for example if more than one type of transducer having the same frequency may be utilized, it is preferred to utilize a further step 320 which compares the transducer frequency obtained for consistency with the frequency of an operator entered transducer type, and displays a warning message in the event of inconsistency.

It should be noted that the above procedure not only determines the nominal operating frequency of a transducer, but also verifies its proper operation in accordance with a technique disclosed in U.S. Pat. No. 4,831,565.

In order to obtain optimum performance from a transducer of given nominal frequency, more precise control over operating frequency is desirable, both to allow for differences between different units, and for operation under different circumstances. To provide a comprehensive characterization of a particular transducer, we have found that at least three, usually different, operating frequencies should be determined, namely the optimum frequency SHORT_FREQ for short range measurements, involving echoes within the ringdown period, for which the size of the echo above the level of ringing should be a maximum; the optimum frequency LONG_FREQ for long range measurements involving echoes outside the ringdown period, for which the maximum echo amplitude should be sought; and the optimum frequency for high accuracy measurements, for which the steepest rising edge of the return echo should be sought. These frequencies are determined by the procedures 212, DETERMINE SHORT_FREQ; 216, DETERMINE LONG_FREQ; and 220, DETERMINE STEEP_FREQ respectively. In order to carry out these procedures, it is necessary that an appropriate echo be generated, and it will normally be desirable to carry out this part of the calibration procedure prior to final installation of the transducer being calibrated so that it may be aimed at an appropriate target, such as a wall, at an appropriate distance to generate a suitable echo for calibration purposes. Calibration in situ will be dependent upon the presence of a reflecting surface at an appropriate range or ranges within a tank, bin, channel or silo being monitored.

Figure 4:
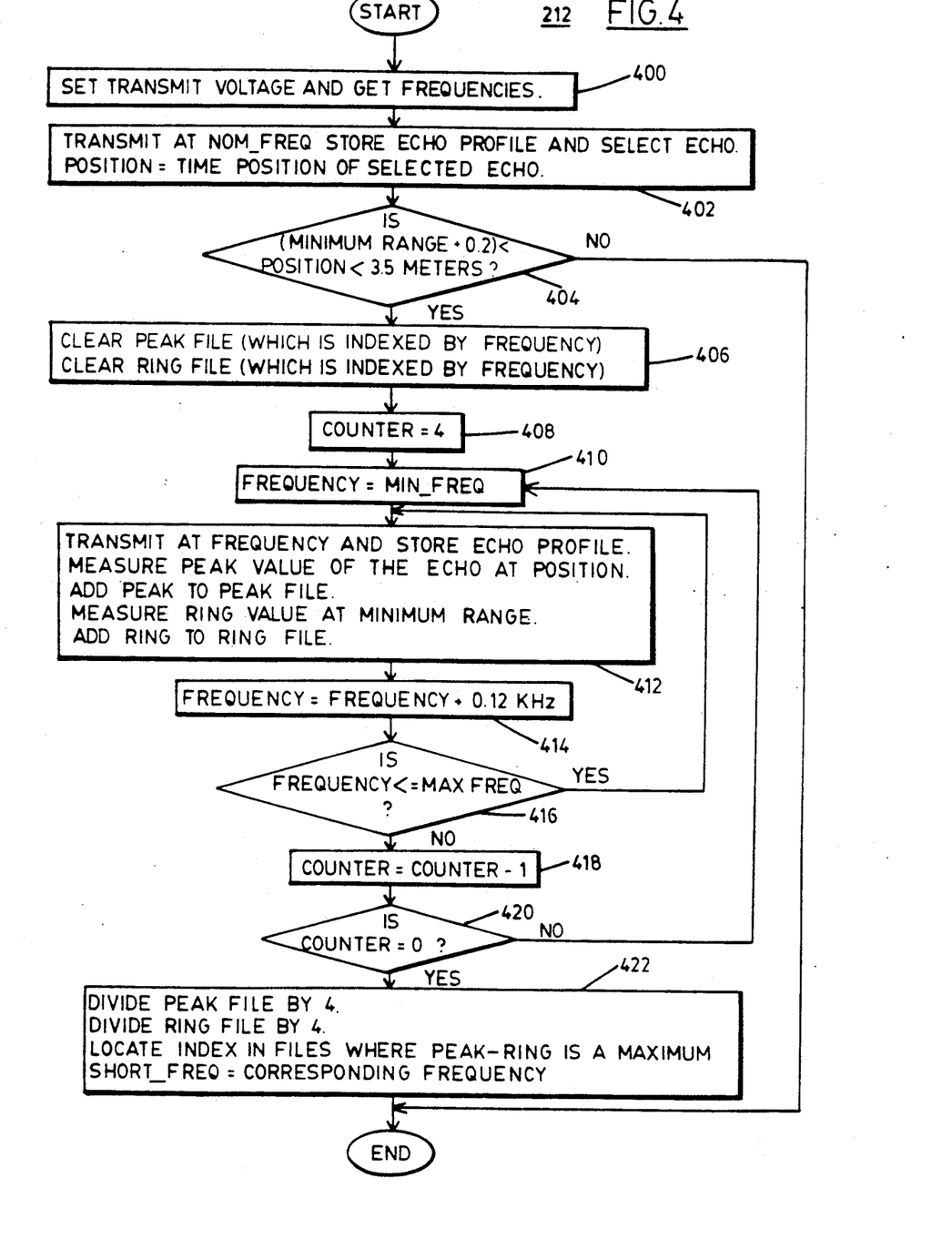
Figure 5:
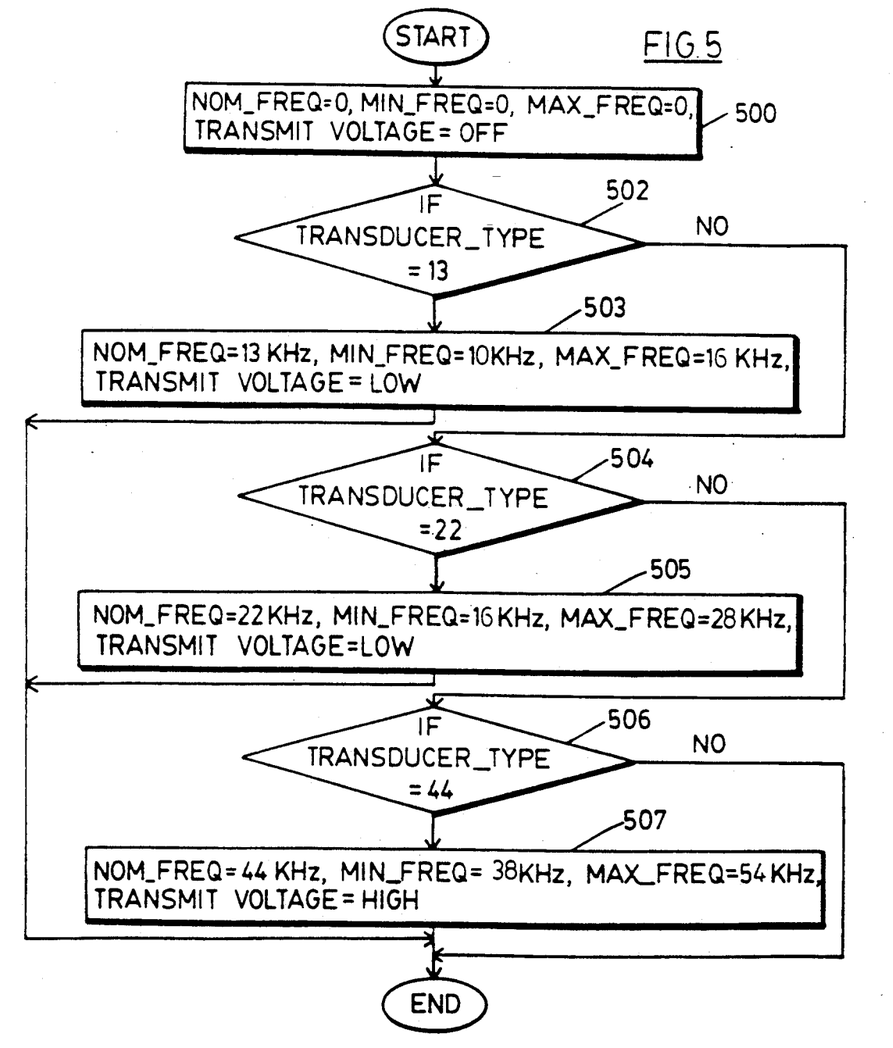

The procedure DETERMINE SHORT_FREQ is shown in FIG. 4. As a first step 400, a further procedure SET TRANSMIT VOLTAGE AND GET FREQUENCIES is called, which is shown in more detail in FIG. 5. In this latter procedure, three variables, NOM_FREQ representing nominal transducer frequency, MIN_FREQ representing minimum transducer frequency, and MAX_FREQ representing maximum frequency are all zeroed (step 500). No transmit voltage is selected at this stage. In steps 502, 504 and 506, if the transducer type is 13, 22 or 44, then appropriate values are stored as the variables (steps 503, 505 and 507), representing the nominal frequency of a transducer of that type, and maximum and minimum frequencies between which a transducer of that type may be operated. The transmit voltage as selected by logic array 32 for application to lines 30 or 34 is selected to be low (lines 34) for transducers of types 13 and 22, and high (lines 30) for transducers of type 44. This is of course a function of the particular transducers whose use is exemplified, and in every case the voltage should be selected to suit the actual type of transducer being used. We have found in fact that at short ranges, there is little penalty involved in operating a transducer below its maximum rated voltage since both output amplitude and ringing fall proportionately as the working voltage is reduced; at longer ranges however, it is important to maintain the highest possible transducer output so as to optimize signal to noise ratio, and thus a transducer should be operated at its full rated voltage.

Reverting to FIG. 4, the transducer is arranged relative to the test target at a range such that an echo will be received from a short range, for example a range between slightly more (0.2 meters) than the minimum range possible and 3.5 meters. In step 402, a shot is transmitted operating the transmitter at nominal frequency NOM_FREQ, and the signal from the receiver is sampled and an echo profile stored. The echo profile is processed utilizing known techniques to identify the echo from the target, and its location on the profile is stored as a variable POSITION. In step 404, a check is made that POSITION is within the specified range, failing which the procedure is terminated.

Two files, for peak amplitudes and ring amplitudes, indexed by frequency, are then cleared (step 406) and a counter is set (step 408) to a number, for example 4, of shots which are to be utilized at each frequency during the procedure to be described below.

In step 410, a variable FREQUENCY is made equal to MIN_FREQ. In step 412 a shot is then transmitted at the frequency specified by variable FREQUENCY, the echo profile is stored, and the echo from the target identified. The peak value of the echo above the ringing level ahead of the echo is stored in the peak file indexed by the value of FREQUENCY. The amplitude of the signal at minimum range is stored in the ring file, indexed by the value of FREQUENCY. The value of FREQUENCY is then incremented (step 414), for example by 120 Hz, and unless FREQUENCY exceeds MAX_FREQ (step 416), execution loops back to step 412. Thus the peak value of the echo and the amplitude of the ringdown at minimum range are tested and stored at intervals between the limiting frequencies MAX_FREQ and MIN_FREQ.

The counter is then decremented at step 418, and if, as tested in step 420, the count has not reached zero, execution loops back to step 410 so that additional shots can be taken at each frequency to avoid the effect of random variations.

If the count has reached zero, the contents of the peak and ring files are divided by 4 to average the stored amplitudes, and the amplitudes stored for each index frequency are compared to determine the frequency at which peak amplitude exceeds the ring amplitude by the greatest amount (step 422).

It should be noted that NOM_FREQ. MIN_FREQ, MAX_FREQ and MINIMUM RANGE and transit voltage will vary according to transducer type. The following examples are typical is determined is respectively named LONG_FREQ and STEEP_FREQ. In determining LONG_FREQ, the frequency providing maximum echo amplitude in the peak file is determined, whilst in determining the slope of the leading edge of the echo at position is determined and added to a file analogous to the peak file, the frequency providing the steepest slope being selected. The return signals during these procedures can if desired be displayed on the oscilloscope 138 to permit manual selection of optimum frequency on the basis of an inspection of the display.

Figure 6:
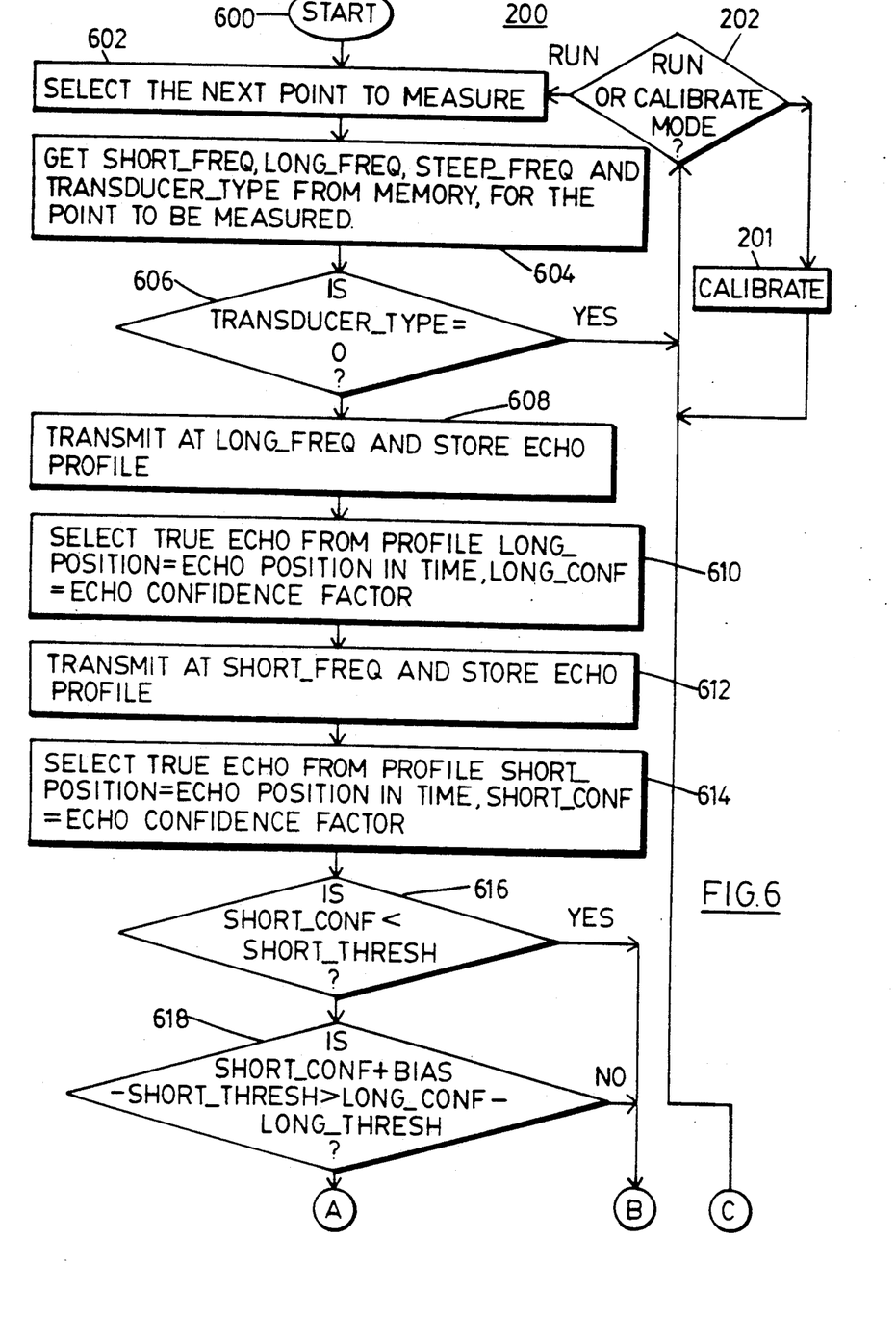
Figure 6A:
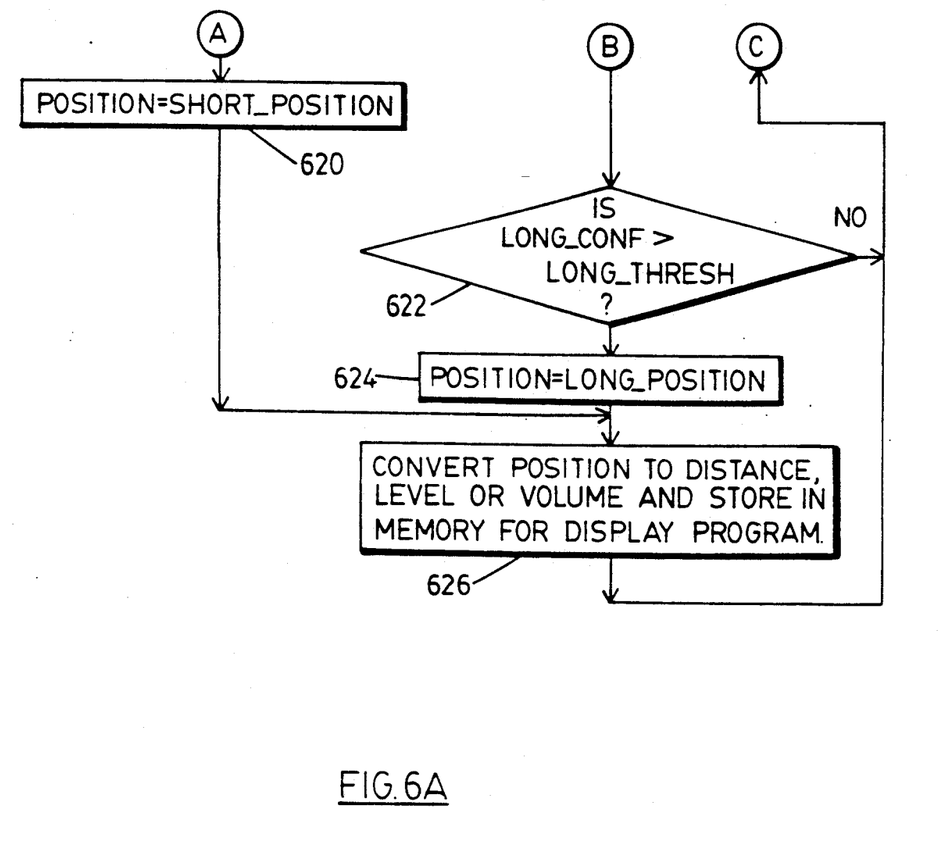

The normal measurement and display routine 200 (see FIG. 2) which is executed in the run mode is described in more detail with reference to FIGS. 6 and 6A. The run loop is entered at point 600 or reentered from the run/calibrate test 200, the first step 602 being selection of the next point or transducer location to measure, each point being selected in rotation. In the next step 604, variables stored in memory relating to that location, for example SHORT_FREQ, LONG_FREQ, STEEP_FREQ TRANSDUCER_TYPE and TRANSMIT_VOLTAGE, are recovered, and TRANSDUCER_TYPE is checked (step 606) to determine whether it indicates that case the transducer is either absent, defective or uncharacterised, in which case and execution loops to step 202.

A shot is then transmitted at LONG_FREQ, and the echo profile stored (step 608); according to requirements this shot may be repeated several times to build an average echo profile. In the following step 610, the stored profile is examined and a probable true echo is selected, the temporal position of the echo in the profile being stored as a variable LONG_POSITION, and the confidence factor attached to the selection being stored as a variable LONG_CONF. The actual data processing used to perform this function does not form part of the present invention. Further description of suitable techniques can be found in my prior patents to which reference has already been made above.

Steps 612 and 614 are then performed, these being similar to steps 608 and 610 except that transmission is at SHORT_FREQ, and the position and confidence data is stored as variables, SHORT_POSITION and SHORT_FREQ. Normally the shots at SHORT_FREQ will be of shorted duration than those at LONG _FREQ, since they are intended to gather short range data; a short shot terminates earlier and has a shorter ringdown period, thus permitting detection of shorter range echoes.

The confidence factor SHORT_CONF is then tested against a threshold SHORT_THRESH to determine whether the confidence factor of the echo identified by the shot (or shots) at SHORT_FREQ is sufficient to

|  | NOM_FREQ | MIN_FREQ | MAX_FREQ | MINIMUM RANGE | VOLTAGE |
|---|---|---|---|---|---|
| 44 KHz Transducer | 44 KHz | 38 KHz | 54 KHz | 0.3 m | High |
| 22 KHz Transducer | 22 KHz | 16 KHz | 28 KHz | 0.6 m | Low |
| 13 KHz Transducer | 13 KHz | 10 KHz | 16 KHz | 0.9 m | Low |

The procedure DETERMINE LONG_FREQ and DETERMINE STEEP_FREQ are similar, except that the ring file is not used, it being verified that the distance to the target is great enough to bring it well outside the ringdown period; and the variable whole value justify further processing (step 616). If it is, SHORT_CONF is incremented by a bias factor BIAS, and its excess as so incremented over SHORT_THRESH is tested to see whether it exceeds the excess of LONG_CONF over a threshold LONG_THRESH set for that confidence factor (step 618). If it does, SHORT_POSITION is transferred to a variable POSITION (step 620).

If either of the tests of steps 616 and 618 fail, a determination is made (step 622) whether LONG_CONF exceeds LONG_THRESH, failing which the program loops back to step 202. Otherwise, LONG_POSITION is transferred to POSITION (step 624). Whichever of SHORT_POSITION and LONG_POSITION is transferred to POSITION, the POSITION variable is processed (step 626) to convert it to one or more of a distance, level or volume measurement which is stored in memory and sent to display 130, in known manner.

The bias in favour of the result from shots at SHORT_FREQ is because short range readings are usually more critical in that they indicate a potential overfill or overflow situation, and a significant short range echo thus merits special consideration: in particular situations, it may be preferred to apply no bias, or to bias selection in the opposite direction to favour long range echoes, as when detection of an empty or low-level situation is more critical then an overfill or overflow situation. The entire procedure is only exemplary of many programs that can exploit the features of the present invention. If maximum accuracy of measurement rather than maximum reliability in echo detection is required, all shots may be taken at STEEP_FREQ, in place of LONG_FREQ, or both LONG_FREQ and SHORT_FREQ.

The ability of the apparatus described to control multiple transducers of different types opens the possibility of utilizing more than one different transducer in a single bin, silo or other container, so as to exploit the different transducer characteristics. In general low frequency transducers provide better performance at long ranges and high frequency transducer provide better performance and higher resolutions at short ranges as well as reducing the minimum range that can be handled. Whilst three or more transducers could be utilized in the same vessel, in most cases two will be sufficient, and the exemplary procedure described below utilizes two transducers although the principles disclosed could be extended to the use of additional transducers.

Figure 7:
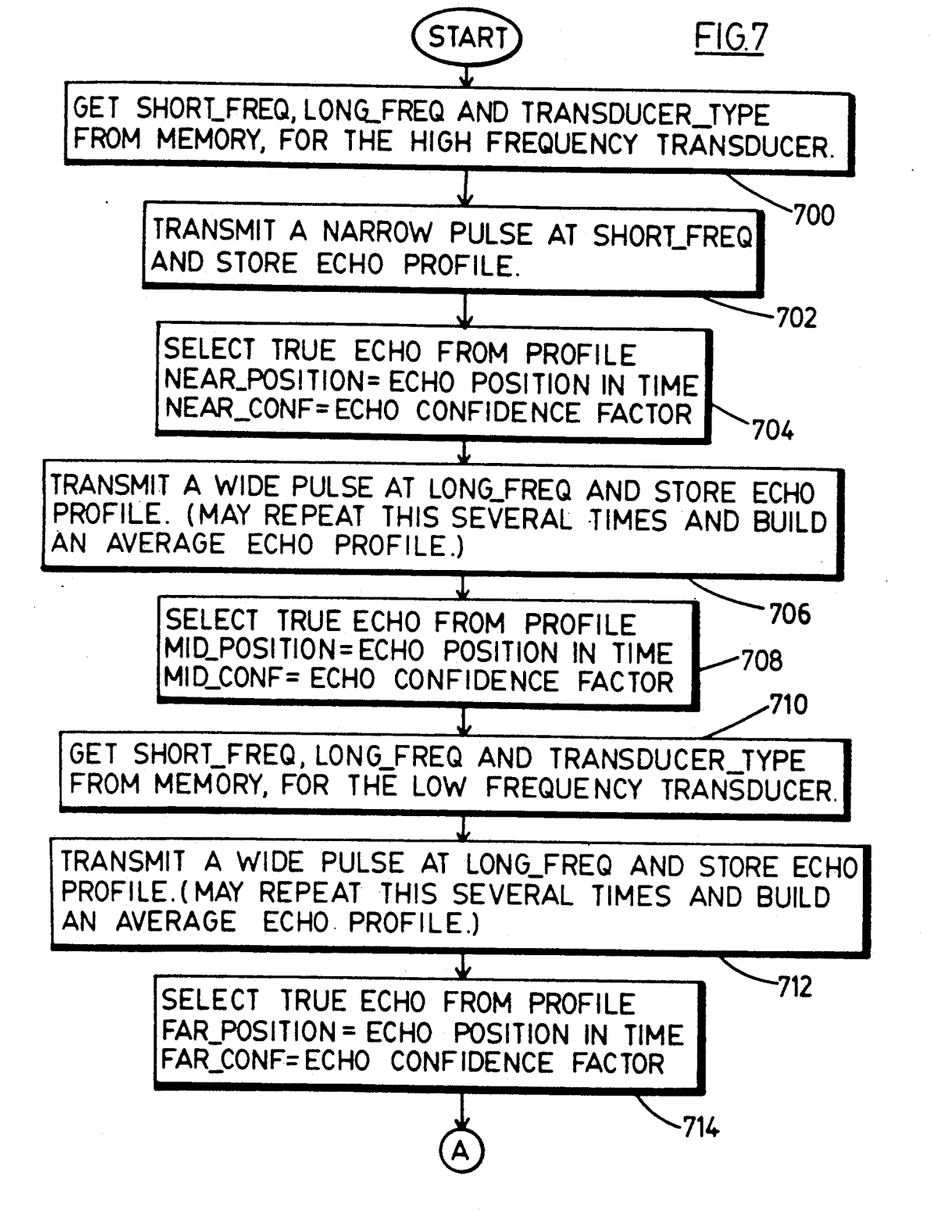
Figure 7A:
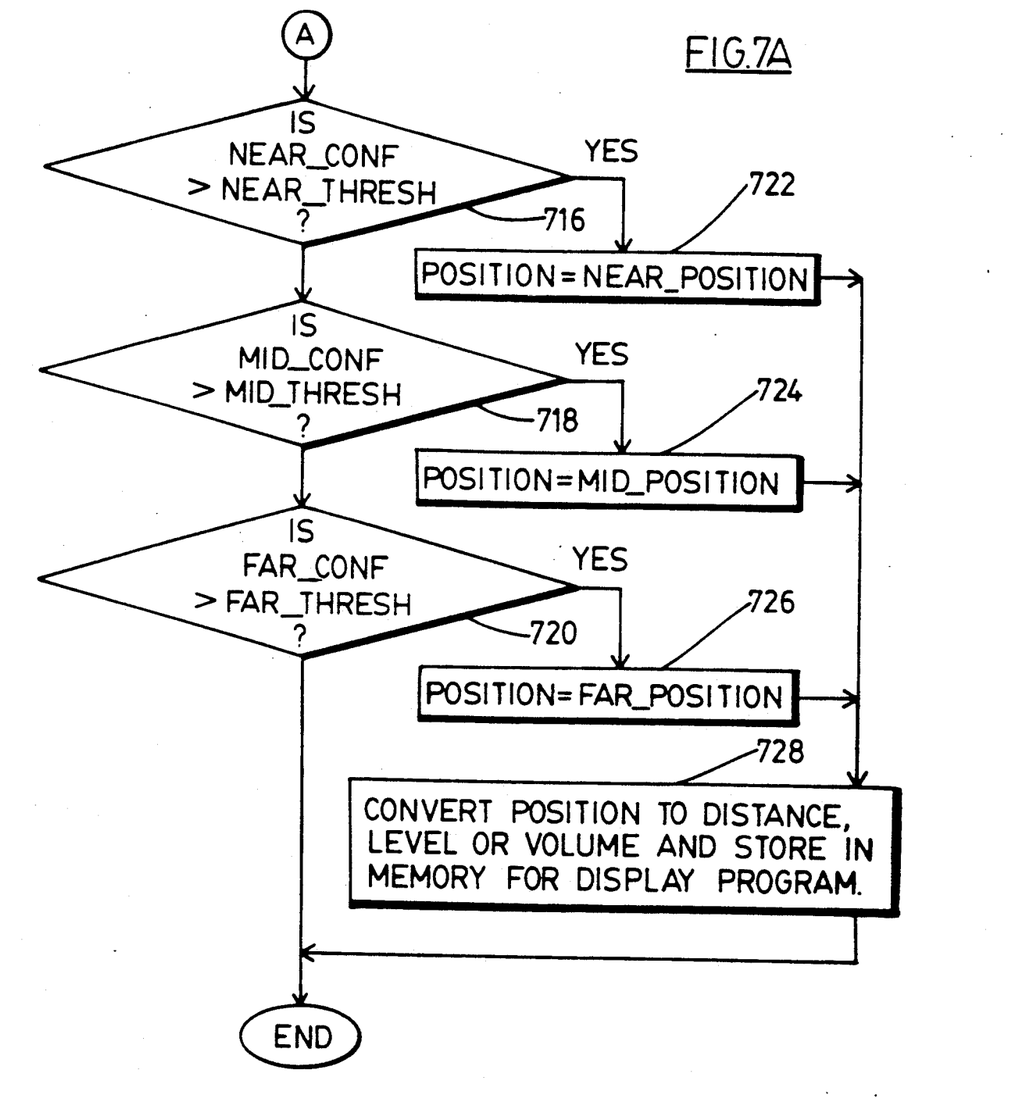

Referring to FIGS. 7 and 7A, a modified form of the procedure 200 is shown for use in an application in which a high frequency transducer and a low frequency transducer are mounted in the same vessel. For simplicity, certain steps have been omitted: it should be understood that steps similar to steps 602 and 606 in FIG. 6 may be included, in the latter case for each transducer. Steps 700, 702, 704, 706 and 708, carried out using the high frequency transducer, are similar to steps 604, 608, 610, 612 and 614 described with reference to FIG. 6, except that the order of execution has been changed, and the position and confidence data obtained are stored in variables NEAR_POSITION, MID_POSITION, NEAR_CONF and MID_CONF. Following three steps 710, 712, and 714, similar to steps 700, 706 and 708 are performed using the low frequency transducer, so as to generate position and confidence data stored in variables FAR_POSITION and FAR_CONF.

The value of NEAR_CONF is then compared (step 716) with a threshold value NEAR_THRESH, and if it exceeds it, the value of NEAR_POSITION is stored in POSITION (step 722). Otherwise (step 718), a further comparison is made to determine whether the value of MID_CONF exceeds a threshold MID_THRESH, in which case the value of MID_POSITION is stored (step 724) in POSITION. Else yet a further comparison (step 720) is made to determine whether the value of FAR_CONF exceeds a threshold FAR_THRESH, in which case the value of FAR_POSITION is stored (step 726) in POSITION. If no threshold is exceeded, the procedure terminates; otherwise POSITION is processed (step 728), as in step 626.

The above described routines are exemplary only. In the simplest case, the apparatus described in FIG. 1 can be utilized in a single or multiple transducer installation, regardless of the type of transducer utilized, data relating to the transducer located at each point being entered into the memory 96, and backed up by non-volatile memory 100, so that the transmitter and receiver characteristics may be controlled as described above in a manner appropriate to the characteristics of the transducer located at any particular point. In more sophisticated applications, the apparatus may not only itself determine the transducer parameters as described above, and exploit them as described to improve performance of the apparatus as also described, but also vary the ranging procedure utilized according to the signals received. For example, in the embodiment of FIG. 6, the selection of the use of STEEP_FREQ in place of LONG_FREQ, or both SHORT_FREQ and LONG_FREQ, might be responsive to the confidence factors measured, with STEEP_FREQ being used as long as the confidence factor of the selected position value remained above a certain threshold higher than LONG_THRESH, and possibly also SHORT_THRESH, with LONG_FREQ, and possibly also SHORT_FREQ being used only when low confidence factors make it desirable to enhance the probability of echo recognition at a possible slight expense in terms of accuracy.

I claim:

1. A control unit for connection to at least one electro-acoustic transducer to form an acoustic ranging system, comprising a transmitter for generating shots of alternating current electric energy for application to each said transducer to generate acoustic energy, a tuned receiver for receiving and amplifying alternating current generated by each said transducer responsive to the receipt of acoustic energy, means for digitizing output from said receiver, and a control computer controlling said transmitter to time said shots and for processing said digitized receiver output to recognize therein features indicative of a primary echo from a target being ranged, said unit further including first electronically controlled means for determining an operating frequency of said transmitter, and second electronically controlled means for causing the tuning of said receiver to track the operating frequency of said transmitter, and said control computer further controlling said first electronically controlled means to determine the frequency of the transmitter during each shot responsive to data relative to characteristics of each said transducer.

2. A control unit according to claim 1 for selective connection to each of a plurality of transducers, wherein the control computer further controls means selectively establishing connection to each said transducer, and stores separate data in respect of each transducer which is utilized to control the operating frequency of the transmitter when connection is established to that transducer.

3. A control unit according to claim 1, wherein the data relating to characteristics of the or each transducer includes data as to a nominal transducer operating frequency.

4. A control unit according to claim 3, wherein the data relating to characteristics of the or each transducer further includes data as to a operating voltage of the transducer.

5. A control unit according to claim 3, wherein the data relating to characteristics of the or each transducer further includes a operating frequency which causes a shot from the transducer to produce a maximum amplitude echo from a target when the echo occurs outside of a ringdown period following the shot.

6. A control unit according to claim 3, wherein the data relating to characteristics of the or each transducer further includes a operating frequency which causes a shot from the transducer producing an echo from a target wherein a ringdown period following the shot, to have maximum amplitude in excess of the amplitude of ringing ahead of the echo.

7. A control unit according to claim 3, wherein the data relating to characteristics of a or each transducer further includes the operating frequency which causes an echo produced by a shot from the transducer to have the steepest rising edge.

8. A control unit according to of claim 3, wherein said control computer is programmed to generate the data relating to the characteristics of the or each transducer, by causing the transmitter to fire a succession of shots at different frequencies, and analyzing resulting signals from the receiver.

9. A control unit according to claim 8, wherein the control computer is programmed to respond to different data relative to the same transducer during successive shots such that such successive shots are at different frequencies determined to provide optimum results at different ranges.

10. A control unit according to claim 2, for selective connection to a plurality of transducers used in the same ranging operation, the control computer being programmed to select from echoes resulting from shots fired from said plurality of transducers that echo from one of said transducers which is deemed most likely to be a true echo.

* * * * *